United States Patent [19]
Himeshima et al.

[11] Patent Number: 5,112,487
[45] Date of Patent: May 12, 1992

[54] POROUS MEMBRANE AND PRODUCTION PROCESS THEREOF

[75] Inventors: Yoshio Himeshima; Hideaki Tanisugi; Tetsuo Watanabe, all of Otsu; Tadahiro Uemura, Kyoto; Masaru Kurihara, Otsu, all of Japan

[73] Assignee: Toray Industries, Inc., Japan

[21] Appl. No.: 476,413

[22] Filed: May 29, 1990

[30] Foreign Application Priority Data

Sep. 29, 1988 [JP] Japan .................................. 63-245260
Oct. 14, 1988 [JP] Japan .................................. 63-259830

[51] Int. Cl.$^5$ ............................................. B01D 67/00
[52] U.S. Cl. ............................ 210/490; 210/500.28; 427/245
[58] Field of Search ................. 210/500.23, 500.27, 210/500.28, 490; 427/245, 246; 264/41, 49

[56] References Cited

FOREIGN PATENT DOCUMENTS 248202 7/1985 Japan .
225636 9/1988 Japan .

*Primary Examiner*—Frank Spear
*Attorney, Agent, or Firm*—Austin R. Miller

[57] ABSTRACT

The present invention relates to a porous membrane which has excellent durability and is useful for ultrafiltration. The porous membrane of the present invention has heterogeneous structure, which consists essentially of a phenylenesulfide-based copolymer of the formula:

$$(Ph-S-Ph-X-)_q-$$

(wherein Ph represents phenylene group, X represents $-SO_2-$ or $-CO-$, and g represents an integer from 80-400 which membrane has a dense layer on one or both surfaces of the membrane, the dense layer controlling the separation performance of the membrane, and a porous layer next to the dense layer, which porous layer has a porosity higher than that of the dense layer.

20 Claims, 3 Drawing Sheets

POROUS MEMBRANE AND PRODUCTION PROCESS THEREOF

TECHNICAL FIELD

This invention relates to a porous membrane which is useful for ultrafiltration.

BACKGROUND ART

Conventionally, applications of ultrafiltration membranes to uses in various fields such as production of pure water for electronic industry, recovery of electroplating coatings, treatment of wastes of paper-producing or pulp factories, treatment of oil-containing wastes, recycling of the wastes from buildings, treatment of wastes in atomic power stations, clarification of fruit juices, production of live sake, concentration of whey, desalination, production of concentrated milk, concentration of egg white, treatment of bean proteins, recovery of enzymes, bioreactors, separation of biological products, removal of particles in the air and removal of particles in organic liquids have been proposed and practiced. In the fields where the ultrafiltration membranes are used, such as the fields mentioned above, the following properties concerning the durability of the membrane are usually required:
  i) Durability against washing with hot water or sterilization with steam (heat resistance);
  ii) Chemical Resistance (resistance to acids, bases, chlorine and so on);
  iii) Solvent Resistance; and
  iv) Low Fouling Properties (low protein-adsorbing properties).

These properties are required because of the treatment conditions normally applied to ultrafiltration membranes, including sterilization and washing for the recovery of the separated material. Separation efficiency tends to be adversely affected by the concentrated solute layer formed on the surface of the membrane during processing. However, an ultrafiltration membrane meeting these requirements has not yet been developed, so that ultrafiltration membranes with high durability are demanded.

Cellulose acetate is often employed as a material for ultrafiltration membranes because they are easy to process. However, ultrafiltration membranes made of cellulose acetate are not satisfactory in durability such as heat resistance, alkali resistance and solvent resistance. Although ultrafiltration membranes made of polyacrylonitrile and polyvinylidene fluoride (Polymer, vol. 21, p. 1047(1980)) have improved solvent resistance, they have poor heat resistance. Although membranes made of polyamide are excellent in heat resistance, they cannot be sterilized with chlorine. The ultrafiltration membranes with which these problems are relatively well overcome are those made of polysulfon (Japanese Laid Open Patent Application (Kokai) No. 22508/75). However, polysulfon membranes have problems in solvent resistance and degradation of permeation efficiency due to the adsorption of solutes or the like. On the other hand, although the problem of solvent resistance was overcome by making the ultrafiltration membranes of a polyimide (Japanese Laid Open Patent Application (Kokai) No. 90098/82), such membranes have poor alkali resistance.

As a porous membrane with excellent heat resistance, chemical resistance and solvent resistance, polyphenylenesulfide (PPS) membranes have been proposed. PPS membranes include two groups, that is, homogeneous porous molded products prepared by molding PPS into a film or hollow fiber by melt-extrusion and by stretching and heat setting the film or hollow fiber (Japanese Laid Open Patent Application (Kokai) No. 6733/83 and Japanese Patent Publication (Kokoku) No. 44404/85), and heterogeneous porous molded products prepared by dissolving PPS under severe conditions, molding the resultant solution into a hollow fiber and coagulating the hollow fiber (Japanese Laid Open Patent Application (Kokai) No. 248202/85).

With the former method, it is difficult to control the pore size of the membrane and the produced membranes cannot have heterogeneous structures, although they can exhibit high permeability as ultrafiltration membranes. With the latter method, because of the high crystallinity of PPS, PPS can be dissolved in only very few solvents even under very severe conditions. Since porous membranes can only be prepared under these limited conditions, it is difficult to control the separation efficiency of the membranes, so that it is difficult to obtain the demanded properties.

On the other hand, it has been proposed to promote the durability of PPS porous membranes by oxidizing PPS so as to convert the sulfide bond into a sulfon bond (Japanese Laid Open Patent Application (Kokai) No. 225636/88). However, with this method, since the oxidization step is carried out after a porous membrane is prepared by the above-described method, it is difficult to control the separation efficiency. Further, in cases where partial oxidization of the sulfide bond is carried out, the polymer becomes a random copolymer, so that the reproducibility of the production process and the durability of the resulting membranes are not satisfactory.

Another major problem in ultrafiltration membranes is the change in the separation efficiency due to the adsorption of the solute on the surface of the membrane.

To reduce adsorption, methods of making the membrane hydrophilic are now being investigated. For example, a method in which an ether bond is introduced into polyvinylidene fluoride (J. Memb. Sci., 36, 257 (1988); Desalination, 70, 207 (1988)), a method in which N-methylolamide and methylenebisamide are introduced into polyacrylonitrile (PCT/US88/00261), and a method in which a polysulfon membrane is treated with an aqueous nonionic polymer solution such as methyl or ethyl cellulose, polyethyleneglycol, and polyvinyl alcohol (ICOM'87) have been proposed.

However, no membranes prepared by these method satisfy the durability requirements mentioned heretofore. Thus, a hydrophilic membrane having excellent durability is strongly demanded.

DISCLOSURE OF THE INVENTION

Accordingly, the object of the present invention is to provide an ultrafiltration membrane and a production process thereof, which ultrafiltration membrane has excellent durability and excellent separation efficiency and ease of controlling its separation efficiency.

The present inventors have intensively studied to find that a porous membrane with an alternating structure made of a specific copolymer containing phenylenesulfide units alternating with sulfonyl or carbonyl units has excellent durability and excellent separation efficiency and yet has high permeability in accordance with the present invention.

That is, the present invention provides a porous membrane having a heterogeneous structure, which consists essentially of a phenylenesulfide-based copolymer of the formula —(Ph—S—Ph—X—)$_q$—

(wherein Ph represents phenylene group, X represents —SO$_2$— or —CO—, and q represents an integer from 80-400) which membrane has a dense layer on one or both surfaces of the membrane, the dense layer controlling the separation performance of the membrane, and a porous layer next to the dense layer, which porous layer has a porosity higher than that of the dense layer.

The porous membrane of the present invention has an excellent separation efficiency and yet has an excellent durability such as excellent solvent resistance, heat resistance, chemical resistance and a low protein-adsorbing properties as well as a high permeability, so that it has excellent properties for ultrafiltration. Thus, the porous membrane of the present invention is excellent not only for ultrafiltration, but also as a support of a composite reverse osmosis membrane and of a gas separation membrane.

BEST MODE FOR CARRYING OUT THE INVENTION

Figure 1:
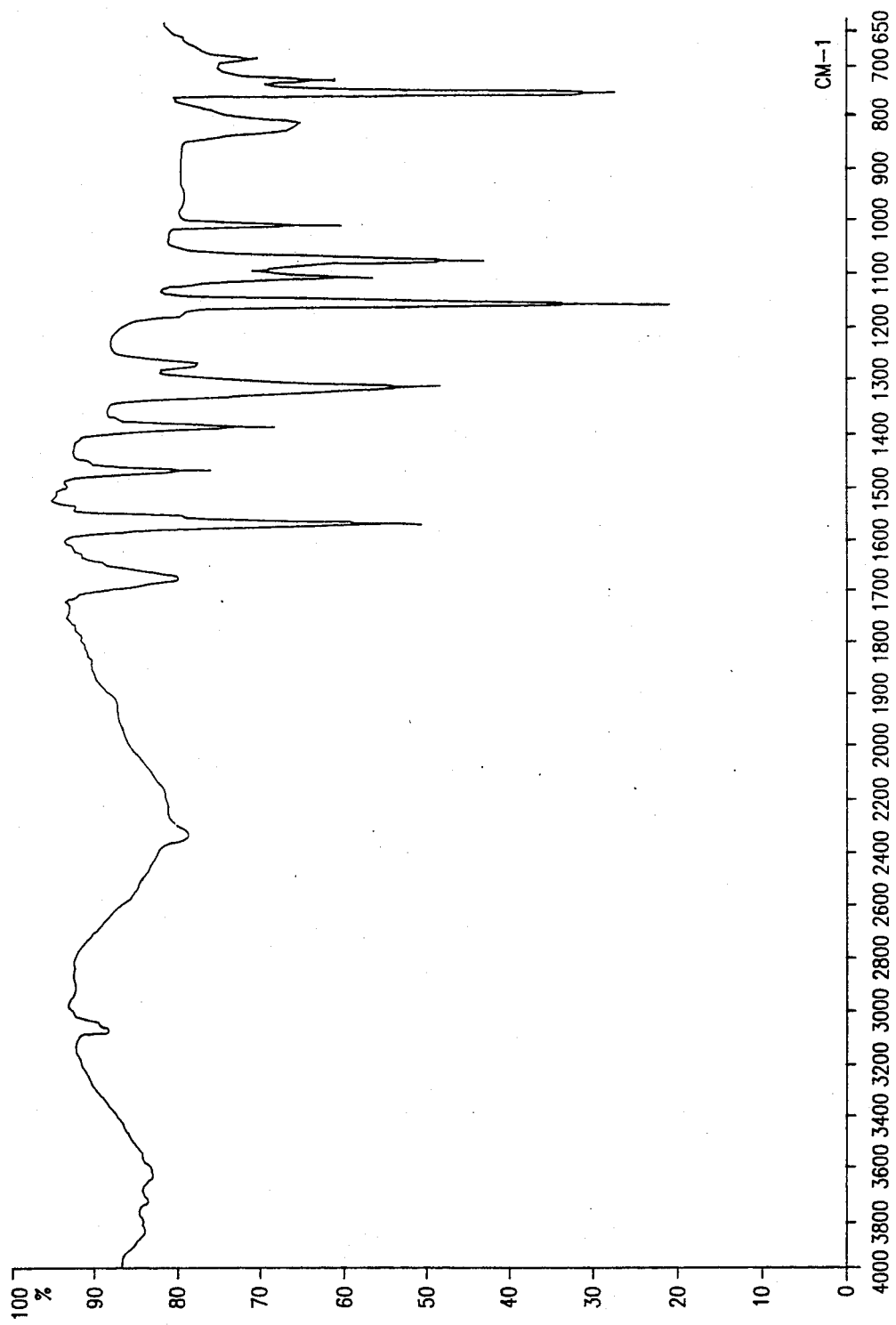
FIG. 1 shows an infrared spectrum of a poly(phenylenesulfidesulfon) obtained in an example of the present invention.

As mentioned above, the porous membrane of the present invention consists essentially of an alternating copolymer of the following formula in which these units are alternately bonded:

—(—Ph—S—Ph—X—)$_q$— wherein Ph and X represent the same meaning as previously discussed, and q represents an integer of 80-400. In view of the reproducibility of the membrane performance and its durability, these alternate copolymers are preferred. That is, in order to stabilize the sulfide bond, it is preferred that an electron attractive group such as a sulfon group or a carbonyl group are present in the next adjacent unit. As the electron attractive group, a sulfon bond which has a larger electron attractive force and which makes the membrane hydrophilic is more preferred. It should be noted however, if that the copolymer has a regularity of about 50%, sufficient reproducibility and durability are obtained in many cases. Although not restricted, the amount of the sulfon bond and/or carbonyl group may preferably be not less than 50 mol % in order to prevent the sulfide bonds from being adjacent each other.

In the formulae set forth herein, Ph means the phenylene group. Although the phenylene group may be substituted with a group such as hydroxyl group, hydroxyethyl group, sulfonic acid group, carboxylic group and hydroxymethyl group, a phenylene group with no substituent is preferred because it improves the properties of the membrane. Although the phenylene group may be o-, m- or p-phenylene group, p-phenylene group is preferred in view of the durability.

X represents a sulfon group or carbonyl group; a sulfon group which has a larger electron attractive force is more preferred.

In order to make the molecular weight of the copolymer large or to stabilize the fusion of the copolymer, an inorganic salt may be added to the copolymer, by which the formation of the porous membrane is not so disturbed. Examples of the inorganic salt may include zinc chloride, zinc fluoride, zinc bromide, zinc iodide, zinc acetate, calcium chloride, calcium fluoride, calcium bromide, calcium iodide and calcium acetate. The copolymer may be a blend of two or more copolymers.

The porous membrane of the present invention may be in any form such as in the form of flat membrane, hollow fiber or tube. The flat membrane may be formed into an element of spiral type, plate and frame type. The tube and the follow fiber may be bundled to form an element. Each of these elements has its characteristics and an appropriate element may be selected for a particular use.

The porous membrane of the present invention, either in the form of a flat membrane or a hollow fiber, has a heterogeneous structure having a dense layer substantially controlling the separation performance of the membrane on the surface of the membrane and a porous layer inside the dense layer, of which porosity is higher than that of the dense layer.

In case of a flat membrane, the solute is separated on the surface of the membrane and after the fluid passes through the membrane surface, the porous layer is useful for increasing the flow rate of the fluid, so that a membrane with high performance may be attained. Although the efficiency of the separation process is higher when the dense layer is thinner, if the dense layer is too thin, the dense layer cannot withstand the pressure exerted to the membrane when a fluid is treated, so that the dense layer may preferably have, although not restricted to, a thickness of 0.1 $\mu$m to 10 $\mu$m. As for the fractionation performance, the membrane may preferably have an solute rejection of not less than 10% when polyethyleneglycol with a molecular weight of 100,000 which is often employed in the evaluation of performance of ultrafiltration membranes is used. In other words, the membrane preferably has a pore size of about 1 to 50 nm. This is because the substances to be separated by the ultrafiltration usually have a molecular weight of 10,000 to 200,000. It should be noted, however, since wide variety of substances may be separated by ultrafiltration, it is preferred that the separation performance may be adjusted depending on the particular use of the membrane, so that the separation performance is not restricted to the above-mentioned range. The porous layer next to the dense layer has a larger porosity than the dense layer and it serves to support the dense layer. The porosity of the membrane may be gradually increased from the dense layer to the porous layer, or it may be sharply increased at a certain region. It is preferred that the membrane have a structure which has a required mechanical strength while the flow resistance of liquid is made small.

In view of the pressure resistance, the thickness of the porous flat membrane of the present invention may preferably be 10 to 300 μm, and taking the flow resistance of liquid into consideration, it may more preferably be 30 to 300 μm.

Although the overall porosity of the membrane is not restricted, it may preferably be 40 to 90%, more preferably 50 to 80% in view of the pressure resistance and liquid flow resistance.

Although the porous flat membrane may be used by itself, the mechanical strength of the membrane may be promoted by forming the flat membrane on a support which is a fabric or a non-woven fabric made from polyester, polyamide, polyethylene, polypropylene and/or polyphenylenesulfide. The polyester may be employed for wide variety of uses, the polyamide may be employed for the uses wherein a high heat resistance is required, the polyethylene and polypropylene may be employed for the uses wherein a high chemical resistance is required, and the polyphenylenesulfide may be employed for the uses wherein a high heat resistance and high chemical resistance are required. Although the weaving density of the support is selected depending on the solvent or concentration of the casting solution later described, it is preferred to select a weaving density with which the casting solution does not penetrate to the backside of the support but permeates to a certain depth of the support.

As for the hollow fiber, the shape of the hollow fiber is primarily expressed by its outer diameter and inner diameter. Although the outer diameter is not restricted, it may usually be 10 mm to 40 μm and may be appropriately selected depending on the particular use. Although the inner diameter is usually about half of the outer diameter, it may be appropriately selected depending on the particular use as long as the membrane thickness is 10 μm or more, so that it is not restricted to the above-described range. The hollow fiber membrane has dense layers at its surfaces and has a porous layer inside the membrane. The dense layers are formed on the inner and outer surfaces of the hollow fiber. In case of an element applying pressure to outer surfaces of the hollow fibers, it is preferred that the dense layer on the outer surface have a greater density, and in case of an element applying pressure to inner surfaces of the hollow fibers, it is preferred that the dense layer on the inner surface have a greater density, although the structure of the membrane is not restricted thereto. Although the porosity (excluding the hollow portion) of the fiber is not restricted, it is usually 10% to 80%, and preferably 20% to 50% in view of the separation efficiency.

From the practical viewpoint, the liquid permeability of the porous membrane of the present invention may preferably be, irrespective of the form of the membrane, not less than 0.1 m³/m²·day when pure water is passed through the membrane at a pressure of 1 kg/cm² at 25° C., although the liquid permeability may preferably be adjusted so as to attain an appropriate separation efficiency for a particular use.

The polyphenylenesulfide-based copolymer may be prepared by a known method such as described in, for example, Japanese Laid Open Patent Application (Kokai) No. 270736/88 that is, it can be prepared by polymerizing bis(4-chlorophenyl)sulfon and sodium hydrogen sulfide under heat in N-methylpyrrolidone as a solvent.

The porous membrane of the present invention may be prepared by dissolving the above-described phenylenesulfide-based copolymer in a solvent, molding the resulting solution and by casting the molded solution into a non-solvent of the copolymer, which is freely miscible with the solvent of the copolymer solution so as to coagulate the copolymer. It should be noted, however, the membrane may be prepared by making the membrane porous after molding the melted copolymer, or by molding a dispersion of the copolymer, so that the production process of the membrane is not restricted to the wet process hereinbelow described.

As a preferred solvent for dissolving the copolymer, although not restricted, aprotic polar solvents, acids and phenol compounds may be employed, although not restricted. Specific examples of the preferred solvent may include dimethylsulfoxide (DMSO), N-methylpyrrolidone (NMP), N,N-dimethyl-2-imidazolidinone (DMI), hexamethylphosphoric triamide (HMPA), sulfuric acid, dichloroacetic acid, p-chlorophenol and m-cresol because these well dissolve the copolymer.

As a characteristic common to these solvents, the solubility parameters ($\delta$) of these solvents are about 11. The $\delta h$ more largely contributes to the solubility of the copolymer than $\delta d$ and $\delta p$ (wherein $\delta h$, $\delta d$ and $\delta p$ represent hydrogen bond force, dispersion force and polarity force components, respectively).

In addition to the above-described solvents, it is possible to empty $\epsilon$-caprolactam, $\gamma$-butyrolactone, sulforan, diphenylsulfide, diphenylamine, $\delta$-valerolactam, dimethylformiamide (DMF) and tetramethylurea for example employed, although not restricted.

The solvent may also be a mixed solvent. That is, a mixture of two or more of the above-described solvents or a mixture of the above-described solvent and a solvent other than mentioned above may be employed. For example, in the case where NMP is used as the solvent, not only the aprotic polar solvents but also halogenated hydrocarbons, ketones, organic acids and amino compounds may be added to the solvent. By the addition of these solvents, the solubility of the copolymer may be promoted and the change in the structure of the membrane or the separation efficiency due to the change in the g value (coagulation value) may be controlled.

To control the pore size of the membrane, an inorganic salt, acid, non-solvent of the copolymer and/or a macromolecular compound may be added to the phenylenesulfide-based copolymer solution. As the inorganic salt, those which are well dissolved in the aprotic solvent are preferred, of which examples include sodium chloride, sodium bromide, lithium chloride, sodium iodide, potassium thiocyanate, potassium iodide, iodine, lead acetate, lead chloride, lead nitrite and potassium permanganate. Preferred examples of the acid include acetic acid, trimeritic acid, lactic acid, sulfuric acid and dichloroacetic acid. Preferred examples of the macromolecular compound include polyvinyl alcohol, polyethyleneglycol and polyvinylpyrrolidone. The amount of these additives may usually be, although not restricted to, 0.1–40% by weight. As the amount of these additives is increased, the pore size of the membrane is enlarged.

The dissolving of the copolymer is usually carried out at a temperature not higher than the boiling point of the solvent. In cases where the solubility of the copolymer is extremely low, pressure may be applied to the solvent so as to elevate its boiling point, and the copolymer may be dissolved in the solvent at a temperature not higher than the elevated boiling point.

To remove contaminants, it is preferred to filter the obtained copolymer solution. Although it is preferred to conduct the filtration using a membrane filter, in cases where the viscosity of the solution is high, a cotton filter may be employed, or the filtration may be carried out at a high temperature. The resulting filtrate is hereinafter referred to as "casting solution".

Although the concentration of the casting solution may be selected arbitrarily within the range of the solubility of the copolymer in the solvent, if the concentration is too low, the formed membrane structure is weak, and if the concentration is too high, the solution is hard to permeate. In general, if the concentration is high, a membrane with high solute rejection and low permeation is obtained. Usually, the concentration of the copolymer in the casting solution may preferably be 10-30% by weight. In the case of flat membranes, as a concentration giving an appropriate viscosity for obtaining practical membrane properties, a concentration of 15-25% by weight is preferred. Since the hollow fiber is not supported by a substrate, the concentration of the casting solution may preferably be higher than that employed in the preparation of flat membranes. That is, 18-30% by weight is usually preferred. In view of the retention of the shape of the hollow fiber during the spinning step and of the separation performance, a viscosity of not less than 0.5 poise is preferred.

In case of preparing a flat membrane, the casting solution is cast on a substrate in a prescribed thickness. In the case of preparing a hollow fiber, the casting solution is extruded from a double spinneret and the spun fiber is introduced into a non-solvent of the copolymer, which is miscible with the solvent of the casting solution. In the case of preparing a flat membrane, the thickness of the casting solution may preferably be, although not restricted to, 30-600 μm because good membrane performance may be obtained.

The hollow fiber may be prepared by extruding the copolymer solution from a double spinneret while spurting out a gas or a liquid from the inner spinneret so as to form a hollow fiber structure, and introducing the obtained fiber into a coagulating liquid. The separation performance of the membrane may be controlled by controlling the temperature at the spinneret, temperature of the coagulating liquid, composition of the liquid to be spurted out, the time from the extrusion to the coagulation and/or the draft value.

The temperature of the casting solution, the time from the casting to the coagulation, the temperature and humidity of the environment from the casting to the coagulation, and the temperature of the coagulating liquid influence the separation performance of the membrane. In many cases, if the temperatures are low, a membrane with high solute rejection and low permeability is obtained.

The coagulation liquid is a liquid which is freely miscible with the solvent of the casting solution and may be a single substance or a mixture of liquids. To control the coagulation speed of the casting solution, an inorganic salt and/or an organic compound may be added to the casting solution. Preferred examples of the inorganic salt may include sodium chloride, sodium bromide, lithium chloride, sodium iodide, potassium thiocyanate, potassium iodide, potassium chloride, iodine, lead acetate, lead chloride, lead nitride and potassium permanganate. Preferred examples of the organic compound may include methanol, ethanol, isopropanol, butanol, polyethyleneglycol, polyvinylpyrrolidone, polyvinyl alcohol, N-methylpyrrolidone, N,N-dimethyl-2-imidazolidone, dimethylformamide, dimethylsulfoxide and hexamethylphosphoric triamide. In cases where it is desired to slow down the coagulation speed, a good solvent of the copolymer may be added to the coagulation liquid. In cases where an aprotic polar solvent and an acid are used as the casting solution, the coagulation liquid may preferably be selected, although not restricted, from water, methanol, ethanol, isopropanol and butanol. The temperature of the coagulation liquid is an important factor like the composition of the coagulation liquid for controlling the separation performance of the membrane. Usually, the temperature of the coagulation liquid may preferably be 0°-50° C.

By oxidizing the thus obtained porous membrane so as to convert a part of the sulfide bonds into sulfon bonds, the heat resistance, chemical resistance and hydrophilicity of the membrane are further promoted. The oxidation may be carried out by using an oxidizing agent. Preferred examples of the oxidizing agent include, although not restricted, hydrogen peroxide, organic peroxide (e.g., peracetic acid, perbutyric acid, perbenzoic acid, chloroperbenzoic acid and the like), alkali metals, alkaline earth metals, quaternary ammonium hypochlorite, chlorine, chromic acid, alkali metal permanganates and nitrates. Since the oxidation reaction is a solid-liquid heterogeneous reaction, the oxidizing agent per se and/or the solvent thereof should be one which can swell the copolymer without changing the microstructure of the membrane so much. From this viewpoint, organic peroxides and/or quaternary ammonium hypochlorite dissolved in an organic solvent are especially preferred. Particularly, although not restricted, peracetic acid, chloroperbenzoic acid, tetrabutylammonium hypochlorite solution in ethyl acetate are especially preferred for efficiently promoting the durability of the copolymer. The oxidation may be carried out by immersing the porous membrane in a solution of the oxidizing agent. Although the temperature of the solution of the oxidizing agent is not restricted, usually 0°-50° C. is preferred. To carry out the reaction efficiently, the reaction may be conducted at a temperature higher than room temperature. In this case, however, care should be taken to avoid causing explosion if a peroxide is used. In cases where the reaction topically proceeds vigorously, it is desired to cool the reaction mixture at a temperature lower than room temperature. Although the time of the oxidation treatment is appropriately selected depending on the concentration of the oxidizing agent and the reaction temperature, it is usually 10 minutes to 5 hours. After the oxidation treatment, the porous membrane may be washed with water and/or alcohol to obtain a durable porous membrane of the present invention.

The methods of measuring the characteristics concerning the present invention will now be summarized.

i) Porosity

A piece with a prescribed size is cut out from the porous membrane and an average thickness is measured to obtain an apparent volume. Then the weight of the porous membrane is measured to obtain the real volume. The porosity is defined by the following equation:

$$\text{Porosity} = \left(1 - \frac{\text{Real Volume}}{\text{Apparent Volume}}\right) \times 100$$

ii) Solute Rejection

When a liquid containing a solute is passed through the membrane, the solute rejection is defined by the following equation:

$$\text{Solute Rejection}(\%) = \left(1 - \frac{A}{B}\right) \times 100$$

(wherein A represents the concentration of the solute in the permeate and B represents the concentration of the solute in the supplied liquid before passing through the membrane)

iii) Water Flux

The weight of a liquid passing through the membrane is measured over a prescribed time at 25° C., and the volume of the liquid in terms of $m^3$ which passed through 1 $m^2$ of the membrane in 24 hours is defined as the water flux.

iv) Solubility Parameter ($\delta$)

The $\delta$ of low molecular compounds can be determined from the heat of vaporization and that of macromolecular compounds is determined from the degree of swelling or Small's equation. However, since the $\delta$ values of many substances are carried by Polymer Handbook (published by Interscience Co., Ltd.), the $\delta$ of many substances can be known by referring to this book.

v) g value

A 2% copolymer solution is prepared and water is added dropwise to the solution at 30° C. The amount of the dropped water at which the copolymer starts to precipitate is defined as the g value.

The present invention will now be described in more detail by way of examples thereof. It should be noted that the present invention is not limited to the examples hereinbelow described.

EXAMPLE 1

(PPS) was synthesized by the method described in Japanese Laid Open Patent Application (Kokai) No. 270736/88.

That is, into an about 1 liter autoclave equipped with means for measuring temperature and pressure, a stirrer and an outer heating means, 154.7 g of bis(4-chlorophenyl)sulfon, 56.5 g of sodium carbonate, 43.7 g of sodium acetate, 50.7 g of sodium hydrogen sulfide (supplied as an aqueous solution containing 59.0% by weight of NaSH), 211.7 g of N-methyl-2-pyrrolidone (NMP) and 14.4 g of deionized water were fed. The mixture was stirred while heating the mixture from 25° C. to 200° C. and was stirred for 3 hours at 200° C.

Then a mixture of 160 ml of NMP and 26.7 ml of deionized water was added and the stirring was continued until the temperature of the mixture reached about 150° C. The reaction mixture was removed from the reactor as solid granules and the liquid was aspirated. The obtained solid was washed with hot deionized water (about 90° C., about 600 ml), filtered and once rinsed on the filter. These operations were repeated twice and the resultant was washed with cold deionized water to remove water-soluble impurities to complete the washing process.

In a one liter autoclave, 40 g of the purified copolymer obtained as above, 400 g of deionized water and 4.0 g of zinc acetate [$Zn(C_2H_3O_2 \cdot 2H_2O$] were fed. A stirrer, heating/cooling apparatus, a thermometer and a pressure gauge were provided on the autoclave. While stirring the mixture of the copolymer/zinc acetate aqueous solution, the temperature of the mixture was raised to 185° C. and was retained at this temperature for one hour. The mixture was then cooled to room temperature, and the recovered copolymer was washed once with hot water (about 90° C., 400 ml) while stirring the mixture. The recovered copolymer was dried at 160° C. under reduced pressure.

The weight average molecular weight of the thus obtained copolymer determined by gel permeation chromatography was 31600 (in terms of polystyrene). The infrared spectrum of the copolymer is shown in FIG. 1. The thus obtained copolymer is hereinafter referred to as "PPSS" (polyphenylenesulfidesulfon). The PPSS is expressed by the formula

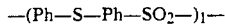

Fifteen grams of the thus obtained PPSS was added to 85 g of dry N-methylpyrrolidone, and the vessel containing the mixture was placed in nitrogen atmosphere, followed by raising the temperature of the mixture to 180° C. to dissolve the copolymer. The resulting solution was filtered through a membrane filter made of polytetrafluoroethylene having a pore size of 1 $\mu$m to remove the insoluble materials. This solution was cast on a glass plate to an average thickness of 150 $\mu$m at room temperature (20° C.), and then the resultant was immediately immersed in water (25° C.) to obtain a porous membrane.

The thus prepared porous membrane had a pure water permeation of 6.24 $m^3/m^2$·day under a pressure of 5 $kg/cm^2$ at 25° C. As to the separation performance, the thus prepared porous membrane had a solute rejection of 98.0% and water flux of 1.22 $m^3/m^2$·day which were determined using 1000 ppm aqueous polyethylene glycol (molecular weight 100,000) at a pressure of 5 $kg/cm^2$ at 25° C. after three hours from the beginning of the filtration.

EXAMPLE 2

The same procedure as in Example 1 was repeated except that the casting solution was cast on a taffeta (both of the warp and weft were multifilaments of 150 denier, weaving density of 90 warps/inch and 67 wefts/inch, 160 $\mu$m thickness) fixed on a glass plate. The pure water permeation was 12.83 $m^3 m^2$·day, and the solute rejection and water flux after 3 hours from the commencement of the filtration of the polyethyleneglycol solution was 95.0% and 2.27 $m^3/m^2$·day, respectively.

Figure 2:
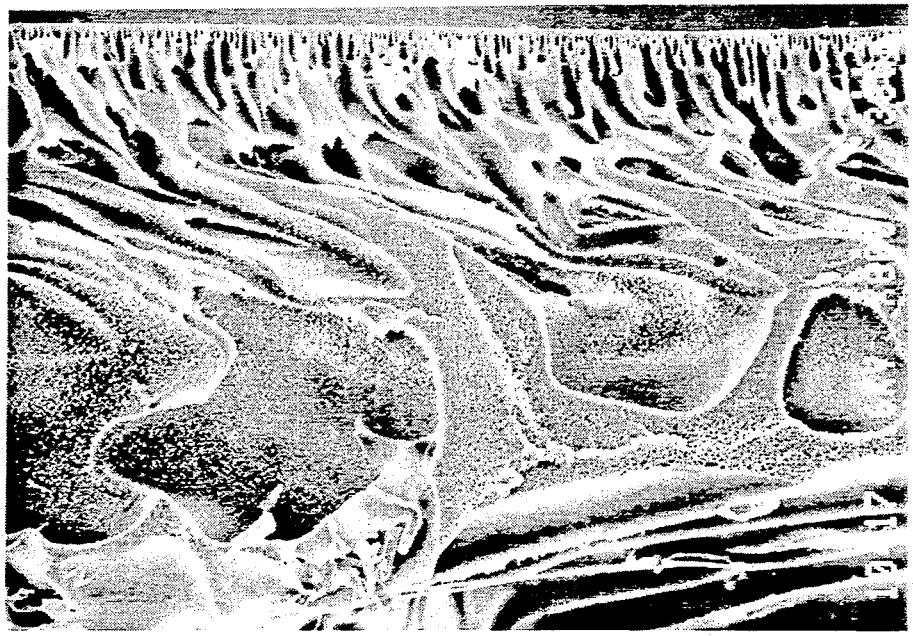
FIG. 2 is a scanning electromicrophotograph showing a cross section of a membrane of an example of the present invention.

A photograph taken with a scanning electromicroscope, which shows the state of the cross section of the obtained membrane is shown in FIG. 2.

Figure 3:
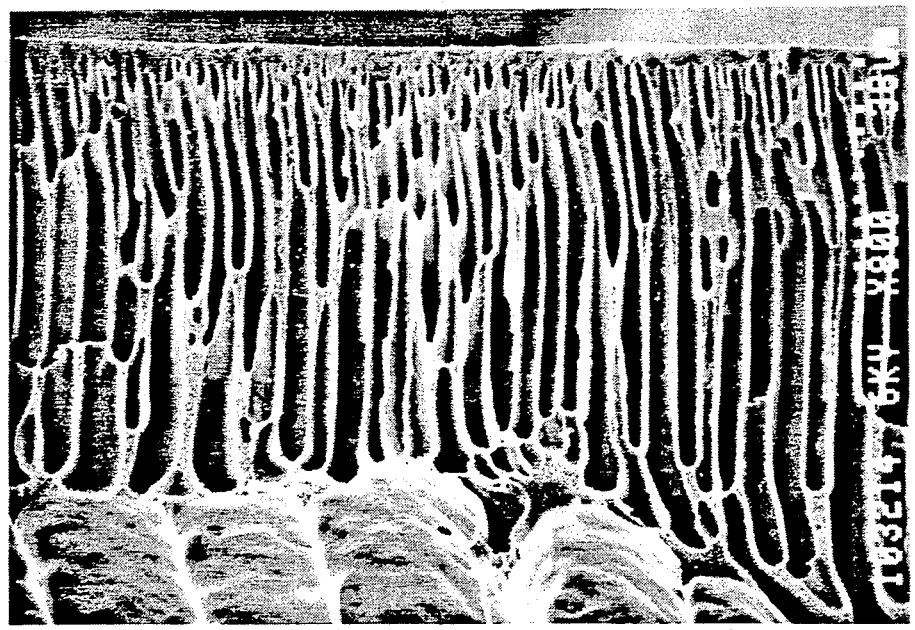
FIG. 3 is a field emission type scanning electromicrophotograph showing a cross section of a membrane of an example of the present invention.

A photograph taken with a field emission type scanning electromicroscope, which shows the cross section of a porous membrane prepared by the same procedure as just mentioned above except that the solvent was dichloroacetic acid is shown in FIG. 3.

EXAMPLES 3-5

The same procedure as in Example 2 was repeated except that the PPSS concentration of the casting solution was changed. The results are shown in Table 1.

TABLE 1

Concentration of PPSS Casting Solution and Separation Performance

| | PPSS Concentration (wt %) | Solute Rejection (%) | Water Flux (m³/m² · day) |
|---|---|---|---|
| Example 3 | 16.0 | 91.8 | 1.27 |
| Example 4 | 17.0 | 98.7 | 1.47 |
| Example 5 | 18.0 | 98.0 | 1.44 |

Evaluation Conditions: Polyethyleneglycol 100,000 (1,000 ppm) Pressure 5 kg/cm², 25° C., Values after 3 hours' operation

EXAMPLES 6-11

The same procedure as in Example 2 was repeated except the composition of the casting solution and that the molecular weight of the polyethyleneglycol used for the evaluation of the separation performance was 20,000. The results are shown in Table 2. When the solvent composition of Example 11 was employed, the elusion of the fine particles from the membrane surface when the membrane was coagulated, which was observed in Examples 1-10, was reduced very much.

TABLE 2

Relationships between Composition of Casting Solution and Various Characteristics of Porous Membrane

| | Composition of Casting Solution*¹ (Weight ratio) | δ*² | g value | Membrane Thickness*³ (μm) | Porosity (%) | Solute Rejection-Water Flux*⁴ (%) - (m³/m² · day) |
|---|---|---|---|---|---|---|
| Example 6 | NMP alone | — | 12.2 | 58.8 | 75.0 | 81.2-2.6 |
| Example 7 | NMP:aniline = 9:1 | 11.4 | 11.5 | 79.6 | 74.3 | 77.4-2.4 |
| Example 8 | NMP:cyclohexanone = 9:1 | 9.9 | 12.1 | 67.4 | 73.0 | 79.5-2.5 |
| Example 9 | NMP:lactic acid = 9:1 | (14.9) | 7.0 | 79.8 | 72.1 | 80.5-2.5 |
| Example 10 | NMP:citric acid = 9:1 | (15.1) | 6.4 | 69.4 | 71.8 | 74.3-2.5 |
| Example 11 | NMP:dichloroacetic acid = 9:1 | 11.0 | 9.0 | 44.4 | 44.4 | 83.9-2.5 |

*¹weight ratio
*²The values in parenthesis are calculated values.
*³Thickness of net porous membrane without a substrate.
*⁴Aqueous polyethyleneglycol (MW 20,000) solution (1,000 ppm) as sample was processed under a pressure of 5 kg/cm² and a flow rate of 3 l/min. for 3 hours.

EXAMPLES 12-41

The PPSS copolymer obtained in Example 1 was added to dry N,N-dimethyl-2-imidazolidinone (DMI) and the vessel containing the mixture was placed in a nitrogen atmosphere. After dissolving the copolymer by heating the mixture to 180°-190° C., the insoluble materials were filtered off. The taffeta used in Example 2 was fixed on a glass plate, and the copolymer solution was cast on the polyester taffeta to an average thickness of 150 μm at room temperature (25° C.). The resultant was then immediately immersed in water to obtain a porous membrane.

In the process just mentioned above, the relationship between the separation performance of the membrane and the concentration of the casting solution, temperature of the coagulation liquid and/or the thickness of the casting solution is shown in Table 3.

TABLE 3

Relationships between Film-forming Conditions and Separation Performance of Porous Membrane

| Concentration of Casting Solution | Clearance | Temperature of Coagulation Liquid | | | | | |
|---|---|---|---|---|---|---|---|
| | | 10° C. | | 20° C. | | 30° C. | |
| 16% | 127 μm | Example 12 | 91.9-1.87 | Example 22 | 88.9-1.87 | Example 32 | 89.0-1.94 |
| | 152 μm | Example 13 | 91.4-1.81 | Example 23 | 89.5-1.86 | Example 33 | 84.6-1.94 |
| 18% | 127 μm | Example 14 | 91.1-1.76 | Example 24 | 91.4-1.75 | Example 34 | 91.9-1.81 |
| | 152 μm | Example 15 | 91.3-1.80 | Example 25 | 92.3-1.84 | Example 35 | 90.6-1.83 |
| 20% | 127 μm | Example 16 | 94.0-1.61 | Example 26 | 93.0-1.59 | Example 36 | 92.7-1.67 |
| | 152 μm | Example 17 | 93.7-1.51 | Example 27 | 94.1-1.66 | Example 37 | 92.1-1.66 |
| 22% | 127 μm | Example 18 | 95.6-1.46 | Example 28 | 94.8-1.27 | Example 38 | 95.9-1.22 |
| | 152 μm | Example 19 | 94.4-1.35 | Example 29 | 94.1-1.39 | Example 39 | 94.0-1.37 |
| 24% | 127 μm | Example 20 | 97.4-1.07 | Example 30 | 95.9-1.04 | Example 40 | 96.3-1.16 |
| | 152 μm | Example 21 | 96.1-1.18 | Example 31 | 96.8-0.94 | Example 41 | 95.4-1.08 |

Evaluation Conditions: Polyethyleneglycol (MW 100,000), 1,000 ppm, Pressure 1 kg/cm², 25° C., Flow Rate 6.5 l/min. Values after 30 minutes' operation

EXAMPLE 42

To 75.6 ml of acetic acid, 22.8 ml of 30% aqueous hydrogen peroxide solution and 1.6 ml of concentrated sulfuric acid were added and the resulting mixture was left to stand for one day to obtain a peracetic acid solution.

The porous membrane obtained in Example 1 was immersed in the thus obtained peracetic acid solution for three hours and the resulting membrane was washed with water. The separation performance of the membrane was evaluated using 1000 ppm aqueous polyethyleneglycol (molecular weight 100,000) solution under a pressure of 5 kg/cm² and a temperature of 25° C. The solute rejection was 97.7% and the water flux was 1.23 m³/m²·day.

In the above-mentioned treatment with peracetic acid, the change in the composition of the porous membrane with time was analyzed by elementary analysis, the results of which are shown in Table 4.

TABLE 4

Change in Composition of Porous Membrane

| Time (minute) | Carbon (%) | Hydrogen (%) | Oxygen (%) |
|---|---|---|---|
| 0 | 57.1 | 3.0 | 13.0 |
| 10 | 52.4 | 2.7 | 20.3 |

TABLE 4-continued

| Change in Composition of Porous Membrane | | | |
|---|---|---|---|
| Time (minute) | Carbon (%) | Hydrogen (%) | Oxygen (%) |
| 60 | 51.2 | 2.6 | 22.1 |

The morphology of the membrane was not changed after immersing the membrane in concentrated sulfuric acid for one hour at room temperature and no endothermic peak was observed up to 400° C. in differential scanning calorimetry (DSC), so that the membrane was stable.

EXAMPLE 43

The porous membrane obtained in Example 2 was immersed in the peracetic acid solution prepared in Example 42 at room temperature for 3 and then the membrane was washed with water. The separation performance of the membrane was evaluated using 1000 ppm aqueous polyethyleneglycol (molecular weight 100,000) solution under a pressure of 5 kg/cm$^2$ and a temperature of 25° C. The solute rejection was 91.9% and the water flux was 1.30 m$^3$/m$^2$·day.

The contact angle of the interface between this membrane and water was 52°. Using 12.6 cm$^2$ of this membrane, ten-fold diluted bovine serum albumin (5 mg/ml) was two-fold concentrated under a pressure of 1.4 kg/cm$^2$, and the loss of protein due to the adsorption by the membrane was measured by the Bradfold's method. The protein loss was 4.0%.

EXAMPLES 44–50

The same procedure as in Example 2 was repeated except that the support was polyester non-woven fabric (MF-110 commercially available from Nippon Vilene) to obtain porous membranes. The obtained porous membranes was immersed in various liquids respectively and their separation performance was evaluated. The results are shown in Table 5.

TABLE 5

| Solvent Resistance of PPSS Porous Membrane | | |
|---|---|---|
| | Liquid | Solute Rejection - Water Flux (%) - (m$^3$/m$^2$ · day) |
| Example 44 | Water | 94.9-1.55 |
| Example 45 | Hexane | 93.8-1.58 |
| Example 46 | Toluene | 90.1-1.53 |
| Example 47 | Trichloroethylene | 90.1-1.57 |
| Example 48 | Acetic Acid | 94.9-1.58 |
| Example 49 | Ethyl Acetate | 85.0-1.59 |
| Example 50 | Methylethyl Ketone | 79.0-1.60 |

Evaluation Conditions: Aqueous polyethyleneglycol (MW 100,000) solution (1,000 ppm) as a sample was processed under a pressure of 5 kg/cm$^2$, flow rate of 3 l/min. at 25° C.

EXAMPLES 51–58

Figure 4:
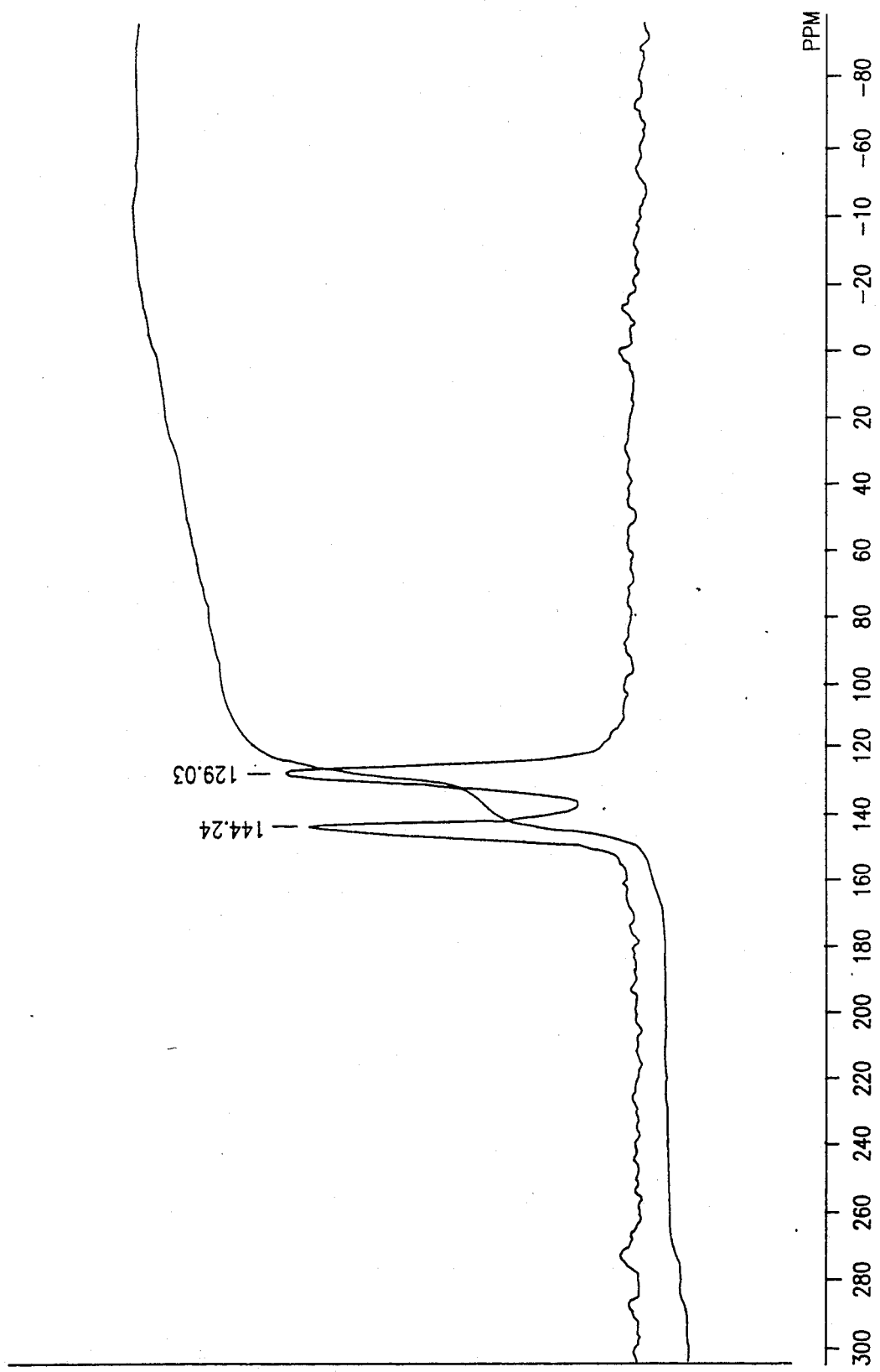
FIG. 4 shows an NMR spectrum of a compound obtained by oxidizing a poly(phenylenesulfidesulfon) prepared in an example of the present invention.

The same procedure as in Example 43 was repeated except that the support was polyester non-woven fabric to obtain porous membranes. The obtained porous membranes were immersed in various liquids respectively and their separation performance was evaluated. The results are shown in Table 6. The CP/MAS$^{13}$CNMR spectrum of the resulting oxidized membrane is shown in FIG. 4.

TABLE 6

| Solvent Resistance of Oxidized PPSS Porous Membrane | | |
|---|---|---|
| | Liquid | Solute Rejection - Water Flux (%) - (m$^3$/m$^2$ · day) |
| Example 51 | Water | 94.5-1.30 |
| Example 52 | Methylene Chloride | 96.1-1.27 |
| Example 53 | Chlorobenzene | 94.2-1.27 |
| Example 54 | Tetrahydrofuran | 86.0-1.38 |
| Example 55 | Methylethyl Ketone | 96.0-1.29 |
| Example 56 | Pyridine | 97.6-1.26 |
| Example 57 | Dimethylformamide | 92.1-1.26 |
| Example 58 | N-methylpyrrolidone | 94.9-1.32 |

Evaluation Conditions: Aqueous polyethyleneglycol (MW 100,000) solution (1,000 ppm) as a sample was processed under a pressure of 5 kg/cm$^2$, flow rate of 3 l/min. at 25° C.

EXAMPLE 59

Two hundred fifty grams of the PPSS copolymer obtained in Example 1 was added to dry N-methylpyrrolidone and the vessel containing the mixture was placed in a nitrogen atmosphere. After dissolving the copolymer by heating the mixture to 180° C., the insoluble materials were filtered off.

The obtained solution was extruded from a double spinneret (outer diameter 0.8 mm, inner diameter 0.6 mm) at an extrusion rate of 2.04 g/minute while injecting an injection solution (NMP/water=60:40, injection rate of 0.75 g/minute). The extruded solution with a dry length of 5 mm was introduced into a water bath (25° C.) and was drawn at a rate of 10 m/minute. After washing the resulting membrane twice (22 seconds each) with water at 30° C., the membrane was treated with hot water at 94° C. for 36 seconds. The resulting hollow fiber membrane was cut into pieces with a length of 50 cm. Thirty pieces were bundled and the bundle was penetrated in a glass tube with a diameter of 15 mm which had an outlet of the filtrate. The end of the glass tube was sealed with epoxy resin and both ends of the glass tube were cut off. The length of the hollow fibers in the resulting element was 26 cm. Distilled water with a pressure of 1.7 kg/cm$^2$ was passed through the inner side of the hollow fiber. The amount of the permeated water was 5.86 m$^3$/m$^2$·day

EXAMPLE 60

The same procedure as in Example 59 was repeated except that the hollow fiber was immersed in the peracetic acid solution prepared in Example 42 for 3 hours. The amount of the permeated water was 2.38 m$^3$/m$^2$·day. Further, water permeability was not degraded after passing methanol or tetrachloromethane for not less than 6 hours.

EXAMPLE 61

To 40 ml of aqueous sodium hypochlorite solution (free chlorine concentration of 4%), 40 ml of ethyl acetate and 1 g of tetrabutylammonium bromide were added and the mixture was vigorously stirred. The mixture was then left to stand until it separated into two phases and the ethyl acetate layer was recovered.

The membrane obtained in Example 2 was immersed in the thus obtained solution at room temperature for 3 hours. By this treatment, the membrane became insoluble in methylene chloride or N-methylpyrrolidone.

The separation performance of the membrane was evaluated using 1000 ppm aqueous polyethyleneglycol (molecular weight 100,000) solution under a pressure of 1 kg/cm$^2$ and a temperature of 25° C. The solute rejection was 87% and the water flux was 1.9 m$^3$/m$^2$·day.

INDUSTRIAL APPLICABILITY

The porous membrane of the present invention is excellent in the durability such as heat resistance, chemical resistance and solvent resistance. Thus, the porous membrane of the present invention has a satisfactory durability even when it is used in the conditions which are severe for the conventional ultrafiltration membranes, such as in the separation or recovery of solvents, treatment of vapor of organic compounds, treatment of hot liquids, thermal sterilization, sterilization with chlorine and washing with an alkali. Further, the porous membrane of the present invention can be used as a support of a composite reverse osmosis membrane or a support of a gas separation membrane. Thus, the porous membrane of the present invention may be used in various fields such as production of pure water for electronic industry, recovery of electroplating coatings, treatment of wastes of paper-producing or pulp factories, treatment of oil-containing wastes, recycling of the wastes from buildings, treatment of wastes in atomic power stations, clarification of fruit juices, production of live sake, concentration of whey, desalination, production of concentrated milk, concentration of egg white, treatment of soybean proteins, recovery of enzymes and bioreactors.

We claim:

1. A porous membrane having heterogeneous structure, which consists essentially of a phenylenesulfide-based copolymer of the following formula —(—Ph—S—Ph—X—)$_q$—, wherein Ph represents phenylene group, X represents —SO$_2$— or —CO—, and q represents an integer from 80–400.

2. The porous membrane of claim 1, wherein X represents —SO$_2$—.

3. The porous membrane of claim 1, wherein Ph represents p-phenylene group.

4. The porous membrane of any one of claims 2, 3 or 1, wherein the dense layer has an ultrafiltration performance which can inhibit the permeation of not less than 10% by weight of polyethyleneglycol when an aqueous solution of polyethyleneglycol with a molecular weight of 100,000 is filtered through the porous membrane.

5. The porous membrane of any one of claims 3 and 1, wherein the porous membrane has a thickness of 10–100 μm.

6. The porous membrane of any one of claims 2, 3 and 1, wherein the porosity of the overall membrane is 20 to 80%.

7. The porous membrane of any one of claims 2, 3 and 1, wherein the permeability of pure water under a pressure of 1 kg/cm$^2$ at 25° C. is 0.1 m$^3$/m$^2$·day.

8. The porous membrane of any one of claims 2, 3 and 1, wherein the porous membrane is in the form of a flat membrane and is laminated on a fabric or a non-woven fabric made of one selected from the group consisting of polyesters, polyamides, polyethylenes, polypropylenes and polyphenylenesulfides.

9. The porous membrane of any one of claims 2, 3 and 1, which is oxidized.

10. The porous membrane of any one of claims 2, 3 and 1, wherein the porous membrane is in the form of a flat membrane, hollow fiber or a tube.

11. A process of producing a porous membrane comprising the steps of dissolving a phenylenesulfide-based copolymer represented by the formula —(—Ph—S—Ph—X—)$_q$— in at least one solvent selected from the group consisting of N-methylpyrrolidone, N,N-dimethyl-2-imidazolidone, hexamethylphosphoric triamide, sulfuric acid and dichloroacetic acid; molding the resulting solution; and coagulating the molded solution in a non-solvent of the phenylenesulfide-based copolymer, which is freely miscible with said solvent.

12. The process of claim 11, wherein the non-solvent of the phenylenesulfide-based copolymer is at least one selected from the group consisting of water, methanol, ethanol and propanol.

13. The process of claim 11, wherein the temperature at which the copolymer is coagulated in the non-solvent of the phenylenesulfide-based copolymer is 0°–50° C.

14. The process of claim 11, wherein the concentration of the phenylenesulfide-based copolymer in said solution is 10–30% by weight.

15. The process of claim 11, wherein the thickness of the molded solution is 30–300 μm.

16. The process of claim 11, further comprising the step of adding to said solution of phenylenesulfide-based copolymer an inorganic salt, an acid, a non-solvent of the phenylenesulfide-based copolymer and/or a macromolecular compound.

17. The process of any one of claims 11 to 16, further comprising the step of oxidizing the porous membrane.

18. The process of claim 17, wherein the oxidation is conducted using an oxidizing agent selected from the group consisting of peracetic acid, chloroperbenzoic acid and tetrabutylammonium hypochlorite.

19. The process of claim 17, wherein the temperature in the oxidation step is 0°–50° C.

20. The process of claim 17, wherein the oxidation treatment is conducted by employing an oxidizing agent and a solvent which can swell the phenylenesulfide-based copolymer.

* * * * *

UNITED STATES PATENT AND TRADEMARK OFFICE
CERTIFICATE OF CORRECTION

PATENT NO. : 5,112,487

DATED : May 12, 1992

INVENTOR(S) : Yoshio Himeshima, et al

It is certified that error appears in the above-identified patent and that said Letters Patent is hereby corrected as shown below:

Column 10, line 56, change "12.83" to —12.85—.

Signed and Sealed this

Twenty-ninth Day of June, 1993

Attest:

MICHAEL K. KIRK

Attesting Officer     Acting Commissioner of Patents and Trademarks